United States Patent Office 3,505,312
Patented Apr. 7, 1970

3,505,312
METHOD OF MANUFACTURE OF HIGH PHTHALYL CONTENT CELLULOSE ACETATE PHTHALATE
Carl J. Malm and Carlton L. Crane, Rochester, N.Y., assignors to Eastman Kodak Company, Rochester, N.Y., a corporation of New Jersey
No Drawing. Continuation of application Ser. No. 548,883, May 10, 1966, which is a continuation-in-part of application Ser. No. 196,580, May 22, 1962. This application Mar. 27, 1969, Ser. No. 812,961
Int. Cl. C08b 3/16
U.S. Cl. 260—225                      5 Claims

ABSTRACT OF THE DISCLOSURE

In the prior art, great difficulty has been encountered in reacting easily prepared dried, hard and having low acetyl cellulose acetates due to their relative impenetrability to most conventional reagents. A method has now been discovered by which such difficulty penetrable cellulose acetates can be prepared for reaction. This method surprisingly involves dissolving the dried low acetyl cellulose acetate in aqueous acetic acid, and subsequently destroying the water in the resulting solution with acetic anhydride to yield a solution of a low acetyl cellulose acetate, which can then be immediately reacted with a dicarboxylic acid or acid anhydride so as to form a cellulose acetate dicarboxylate.

---

This is a streamlined continuation of U.S. patent application Ser. No. 548,883, filed May 10, 1966 and now abandoned, which in turn was a continuation-in-part of U.S. patent application Ser. No. 196,580, filed May 22, 1962, now abandoned.

In the preparation of high phthalyl cellulose acetate phthalates such as those having a combined phthalyl value of at least 28%, the cellulose acetate used as a starting material should have an acetyl content of 29–34%. With the procedures heretofore described, a cellulose acetate of powdered or flake type was employed to get good results. Cellulose acetates of 29–34% acetyl content are relatively water susceptible, hence, unless special care is used in their preparation, gelatinous precipitates which, when dry, are hard and horny result. Such cellulose acetates while easily prepared are difficultly penetrable, hence, do not lend themselves readily to use as starting materials in the procedures described in the prior art.

Present methods for preparing cellulose acetate phthalates containing above 28% phthalyl involve to a great extent reacting cellulose acetate with an esterification bath composed of sodium acetate, acetic acid and phthalic anhydride for reaction times of at least 5 hours at elevated temperatures. These extended reaction times reflect the difficult penetration into the cellulose acetate used in the process. If for instance, a cellulose acetate of 29–34% acetyl is added directly to a reaction mixture of phthalic anhydride, acetic acid and sodium acetate, as much as 8 hours of esterification at elevated temperatures may be required to give a uniform cellulose acetate phthalate having good solubility properties.

One object of our invention is to provide a somewhat shortened procedure for preparing cellulose acetate phthalates, or cellulose acetate polycarboxylates generally. Another object of our invention is to provide a process for preparing cellulose acetate polycarboxylates which can make use of easily prepared hard and horny cellulose acetates as a starting material. A further object of our invention is to provide a process for preparing high phthalyl cellulose acetate phthalates in which the use of the usual anhydrous nonionizable organic solvents may be dispensed with. Other objects of our invention will appear herein.

Our invention relates to the preparation of cellulose acetate polycarboxylates, having a high content of polycarboxylic acid radicals by esterifying cellulose acetate having an acetyl content of 29–34% with the anhydride of the polycarboxylic acid and an alkali metal acetate catalyst. Some cellulose esters which may be prepared by the method of the invention using the corresponding anhydride to esterify cellulose acetate are:

cellulose acetate phthalate
cellulose acetate succinate
cellulose acetate tetrahydrophthalate
cellulose acetate hexahydrophthalate
cellulose acetate trimellitate
cellulose acetate tetrachlorophthalate We have found a procedure for preparing high phthalyl cellulose acetate phthalates using as the starting material cellulose acetates having an acetyl content of 29–34% even where characterized by high bulk density as for example pellet-type cellulose acetates. High bulk density or pellet-type celluose acetates are much easier to make than more susceptibe types, hence, their use as the starting material contributes to the economy of the manufacture of cellulose acetate phthalate.

We have found that the low acetyl type cellulose acetates such as having an acetyl content of 29–34% readily dissolve in aqueous acetic acid at elevated temperatures and in solution in acetic acid are particularly susceptible to phthalation with phthalic anhydride catalyzed by sodium acetate. Our invention is adapted to the making of cellulose acetate phthalate containing at least 28% phthalyl such as would have a percentage of acetyl within the range of 16–22%.

Our procedure involves in the beginning dissolving cellulose acetate of the specified acetyl content in aqueous acetic acid having an 85–95% acetic acid concentration with or without sodium acetate or other alkali metal acetate therein. For instance, at a moderately elevated temperature such as 120–150° F. the cellulose acetate may require an hour to dissolve while at a higher temperature such as 180° F. the dissolving may take place within one-half hour, the temperature of dissolving being optional with the individual operator. Although the dissolving may be in liquid consisting of water and acetic acid, it is preferable to include a small amount of sodium acetate to inhibit the introduction of acetyl to the cellulose acetate in solution and change in the ratio of primary to secondary hydroxyl groups particularly where higher temperature dissolving is used. Obviously, some other acetate material such as potassium acetate could be employed instead of the sodium acetate. The sodium (or potassium) acetate may be used as such or an alkaline material such as $Na_2CO_3$ or NaOH may be mixed with acetic acid to form sodium acetate.

After the cellulose acetate is all dissolved, the water in the solution is destroyed by the addition of acetic anhydride in the presence of at least 0.1 part of sodium acetate per part of cellulose acetate all by weight. If sodium acetate had already been supplied in the dissolving operation, addition sodium acetate may not be required. Although more sodium acetate than specified may be used, care is advised because too much may interfere with the stirring of the mass. The acetic anhydride may if desired be added along with the phthalic anhydride employed for esterification and with the sodium acetate catalyst employed to promote the esterification. The presence of sodium acetate inhibits any tendency by the acetic anhydride to add to the acetyl content of the cellulose acetate used as the starting material.

The esterification is carried out for only 1 to 2 hours at the most convenient temperature (ordinarily no more than 180° F.) to give a clear uniform solution. The cellulose acetate phthalate thus formed may be removed from the liquid portion of the esterification mass by precipitating in water, optionally containing a small amount of mineral acid. The presence of mineral acid in the precipitation liquid contributes to the removal of residual salt from the cellulose acetate phthalate. The esterification proper is carried out using relative proportions of the reagents similar to those of previous like procedures of this type such as described in U.S. Patent No. 2,459,925 of Hiatt, Mench and Emerson. The products prepared as described are useful for purposes requiring alkali soluble cellulose esters such as removable backing layers for photographic film base and similar purposes. The following examples illustrate our invention:

EXAMPLE 1

7.6 parts of acetic acid, .4 part distilled water and .4 part of sodium acetate were placed in a sigma-bladed jacketed mixer and heated to 120° F. over a period of 3 minutes. 8.2 parts of 33.3% acetyl content cellulose acetate (179 cp. viscosity at 10% concentration in pyridine) containing 2.5% moisture were added and the mass was heated with stirring for 1 hour to give a clear uniform solution. 9.6 parts phthalic anhydride, 3.6 parts sodium acetate and 3.6 parts acetic anhydride were mixed in and the reaction temperature was allowed to rise to 180° F. Although, in this instance, acetic anhydride and phthalic anhydride were added simultaneously to the solution, practically all of the water in the solution reacts with the acetic anhydride before the reaction of the phthalic anhydride with the cellulose acetate begins.

Portions of the reaction solution were removed at one and two hour intervals, diluted with equal parts of acetic acid and precipitated in distilled water. The precipitates were washed in distilled water until essentially free from uncombined acids and dried. The dried product (cellulose acetate phthalate) analyzed as follows:

| Reaction time | Phthalyl, percent | Viscosity at 15% concentration in acetone at 25° C. (cps.) |
| --- | --- | --- |
| 1 hour | 33.7 | 61 |
| 2 hours | 34.5 | 61 |

EXAMPLE 2

7.4 parts acetic acid and 0.36 part distilled water were placed in a jacketed sigma-bladed mixer at 130° F. and 8.2 parts 33.3% cellulose acetate consisting of 8 parts bone dry cellulose acetate and 0.2 part moisture was stirred in for one hour thus dissolving the cellulose acetate. At the end of this time a sample of the cellulose acetate removed and precipitated in distilled water was found to have essentially the same acetyl contents, primary (1°) and secondary (2°) hydroxyl contents and ratios of primary to total hydroxyl as the original cellulose acetate as follows:

| | Percent | | |
| --- | --- | --- | --- |
| | Acetyl | 1° OH | Total OH |
| Original cellulose acetate | 33.3 | 2.66 | 7.3 |
| After 1 hour in solution | 33.0 | 2.60 | 7.1 |

4 parts sodium acetate, 9.6 parts of phthalic anhydride and 3.7 parts of 97% acetic anhydride was stirred into the cellulose acetate solution in the mixer and the mass was heated and then permitted to rise to a temperature of 180° F. At the end of one hour the reaction was completed. The mass was then simultaneously cooled and diluted with cold distilled water. Stirring was continued until precipitation occurred and the cellulose acetate phthalate product had become a fine powder. The powder was purified by washing in successive changes of distilled water until substantially free from uncombined acids and dried at 150° F. The cellulose acetate phthalate obtained analyzed as follows: Phthalyl, 32.2%; viscosity at 15% concentration in acetone at 25° C., 73 cp.

EXAMPLE 3

302 parts of acetic acid (freezing point 16.4° C.) was heated to 160° F. and was placed in a jacketed sigma-bladed mixer with 10.75 parts distilled water. 16.5 parts sodium acetate and 335 parts cellulose acetate (32.9% acetyl content and containing 3% moisture) were added.

The mixture was stirred and heated at 160° F. for 30 minutes dissolving the cellulose acetate. 146 parts of sodium acetate, 390 parts phthalic anhydride and 151 parts acetic anhydride were then added and the temperature was allowed to rise to 180° F. After reaction for one hour, 1780 parts of 36° F. distilled water were added reducing the temperature of the mass to 80° F. whereupon the product precipitated as a fine powder. Stirring was continued until a uniform precipitate was obtained. 365 parts of distilled water containing 8.1 parts of concentrated sulfuric acid were then added and stirring was continued for 30 minutes. The product was then comminuted by passing through a screen having 0.109″ diameter mesh which product was washed in successive changes of distilled water until substantially free from uncombined acid. It was then dried. The dry product analyzed as follows: Phthalyl, 33.8%; viscosity at 15% concentration in acetone at 25° C., 69 cp.

EXAMPLE 4

Using the same quantities and temperatures as in Example 3 the solution time was extended to one hour followed by a reaction time of one hour. The product was processed and purified as in Example 3. The product analyzed as follows, Phthalyl, 35.4%; viscosity at 15% concentration in acetone at 25° C., 68 cp.

EXAMPLE 5

Cellulose acetate having an acetyl content of 33⅓% was converted into cellulose acetate tetrahydrophthalate by the procedure described in Example 1 except that 9.9 parts of tetrahydrophthalic anhydride were employed in esterifying 8.2 parts of cellulose acetate rather than the 9.6 parts of phthalic anhydride referred to in that example. A cellulose acetate tetrahydrophthalate having a high tetrahydrophthalyl content was obtained.

EXAMPLE 6

800 parts of acetic acid, 40 parts of distilled water and 45 parts of sodium acetate together with 880 parts of cellulose acetate (33% acetyl content) containing 2.2% moisture were placed in a jacketed sigma-bladed mixer and the mass was stirred at 140° F. at 1½ hours whereupon complete solution had occurred. 385 parts of sodium acetate, 875 parts of succinic anhydride and 355 parts of 95% acetic anhydride were added and the reaction temperature was allwed to rise to 150° F. which was maintained for 2 hours. The mass was then cooled, 3000 parts of distilled water was added and the mass was stirred until a uniform precipitate was obtained. The precipitate was washed repeatedly with successive changes of 130° F. distilled water until free of uncombined acid and was then dried. Cellulose acetate succinate was obtained having a combined succinyl content of 33%. It was soluble in 1½% aqueous sodium carbonate to give a solution of 5% concentration.

What is claimed is:

1. In a process for manufacturing cellulose acetate dicarboxylates having high combined dicarboxylic acid radical content starting with dry, hard, particulated cellulose acetate having an acetyl content of 29–34%, which process comprises subjecting a solution of said cellulose acetate in acetic acid to esterification conditions in contact with an anhydride of a dicarboxylic acid and a lower fatty acid metal salt catalyst; the improvement which comprises (a)

initially dissolving said dry, hard, particulated cellulose acetate in an aqueous solution of acetic acid having an acetic acid content of from about 85 to about 95 weight percent, and (b) subsequently, but prior to the esterification step, allowing the water in the resulting solution to be destroyed by the reaction of said water with acetic anhydride.

2. A method for manufacturing cellulose acetate phthalate having a high combined phthalyl content from dry, particulated cellulose acetate having an acetyl content of 29–34%, which process comprises (a) initially dissolving said dry, particulated cellulose acetate in aqueous acetic acid having an acetic acid concentration of from about 85 to about 95 weight percent, (b) subsequently destroying the water in the resulting solution by adding to said solution a composition comprising acetic anhydride and at least about 0.1 part, by weight, of alkali metal acetate per part, by weight, of cellulose acetate in said solution; and (c) then subjecting the resulting anhydrous soultion of cellulose acetate to esterification conditions in an esterification bath comprising phthalic anhydride and a lower fatty acid metal salt catalyst to thereby produce said cellulose acetate phthalate.

3. In a process for manufacturing cellulose acetate tetrahydrophthalate having high combined tetrahydrophthalate content starting with dry, hard, particulated cellulose acetate having an acetyl content of 29–34%, which process comprises subjecting a solution of said cellulose acetate in acetic acid to esterification conditions in contact with tetrahydrophthalic anhydride and a lower fatty acid metal salt catalyst; the improvement which comprises (a) initially dissolving said dry, hard, particulated cellulose acetate in an aqueous solution of acetic acid having an acetic acid content of from about 85 to about 95 weight percent, and (b) subsequently, but prior to the esterification step, allowing the water in the resulting solution to be destroyed by the reaction of said water with acetic anhydride and at least about 0.1 part, by weight, of alkali metal acetate per part of cellulose acetate in said solution.

4. A method for manufacturing cellulose acetate dicarboxylates having a high combined dicarboxylic acid radical content from dry, particulated cellulose acetate having an acetyl content of 29–34%, which process comprises (a) initially dissolving said dry, particulated cellulose acetate in aqueous acetic acid having an acetic acid concentration of from about 85 to about 95 weight percent and a temperature of approximately 160–180° F., (b) subsequently allowing the water in the resulting solution to be destroyed by adding acetic anhydride to said solution; and (c) then subjecting the resulting anhydrous solution of cellulose acetate to esterification conditions in an esterification bath comprising an anhydride of a dicarboxylic acid and a lower fatty acid metal salt catalyst to thereby produce said cellulose acetate phthalate.

5. A method for manufacturing cellulose acetate phthalate having a high combined phthalyl content from dry, particulated cellulose acetate having an acetyl content of 29–34%, which process comprises (a) initially dissolving said dry, particulated cellulose acetate in aqueous acetic acid having an acetic acid concentration of from about 85 to about 95 weight percent and a temperature of approximately 160–180° F., (b) subsequently destroying the water in the resulting solution by adding to said solution a composition comprising acetic anhydride and at least about 0.1 part, by weight, of alkali metal acetate per part, by weight, of cellulose acetate in said solution; and (c) then subjecting the resulting anhydrous solution of cellulose acetate to esterification conditions in an esterification bath comprising phthalic anhydride and a lower fatty acid metal salt catalyst to thereby produce said cellulose acetate phthalate.

References Cited

UNITED STATES PATENTS 2,768,161  10/1956  Malm et al. _____ 260—225
2,856,400  10/1958  Malm et al. _____ 260—225

DONALD E. CZAJA, Primary Examiner

R. W. GRIFFIN, Assistant Examiner

U.S. Cl. X.R.

106—198